US012149899B2

(12) United States Patent
Zhou et al.

(10) Patent No.: US 12,149,899 B2
(45) Date of Patent: Nov. 19, 2024

(54) ACOUSTIC CROSSTALK CANCELLATION

(71) Applicant: Cirrus Logic International Semiconductor Ltd., Edinburgh (GB)

(72) Inventors: Dayong Zhou, Austin, TX (US); Brad Zwernemann, Austin, TX (US); Kaichow Lau, Austin, TX (US); Dana J. Taipale, Austin, TX (US); John L. Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 67 days.

(21) Appl. No.: 17/847,319

(22) Filed: Jun. 23, 2022

(65) Prior Publication Data

US 2023/0421951 A1 Dec. 28, 2023

(51) Int. Cl.
*H04R 3/02* (2006.01)

(52) U.S. Cl.
CPC .................................... *H04R 3/02* (2013.01)

(58) Field of Classification Search
CPC . H04R 3/005; H04R 3/02; H04R 3/04; H04R 3/05; H04R 3/12; H04R 3/14;
(Continued)

(56) References Cited

U.S. PATENT DOCUMENTS 6,243,476 B1 * 6/2001 Gardner .................. H04S 3/002 381/1
7,801,317 B2 * 9/2010 Kim ........................ H04S 1/002 381/1

(Continued)

OTHER PUBLICATIONS

Combined Search and Examination Report under Sections 17 and 18(3), UKIPO, Application No. GB2305649.2, mailed Nov. 6, 2023.

*Primary Examiner* — Paul Kim
(74) *Attorney, Agent, or Firm* — Jackson Walker L.L.P.

(57) ABSTRACT

Circuitry for acoustic crosstalk cancellation between first and second acoustic signals, the circuitry comprising: crosstalk cancellation circuitry configured to: receive a first audio signal and, based on the received first audio signal, generate a first crosstalk cancellation signal; receive a second audio signal and, based on the received second audio signal, generate a second crosstalk cancellation signal; combine the first crosstalk cancellation signal with a signal indicative of the second audio signal to generate a first crosstalk cancellation circuitry output signal; and combine the second crosstalk cancellation signal with a signal indicative of the first audio signal to generate a second crosstalk cancellation circuitry output signal; and output stage circuitry configured to: receive the first crosstalk cancellation circuitry output signal and, based on the received first crosstalk cancellation circuitry, generate a first drive signal for driving a first speaker to generate the first acoustic signal; and receive the second crosstalk cancellation circuitry output signal and, based on the received second crosstalk cancellation circuitry, generate a second drive signal for driving a second speaker to generate the second acoustic signal, wherein a parameter of the crosstalk cancellation circuitry is variable based on one or more of: a position of a user of a host device incorporating the circuitry with respect to the host device; a volume setting of the host device; a level of the first and/or second crosstalk cancellation signal; and an operational parameter of the output stage circuitry.

20 Claims, 4 Drawing Sheets

(58) Field of Classification Search
CPC ...... H04R 25/45; H04R 25/453; H04R 25/50; H04R 5/04; H04R 2430/01; H04S 3/00; H04S 3/006; H04S 7/00; H04S 7/302; H04S 7/303; H04S 1/007; H04S 7/307; H04S 2400/09; H04S 2400/13; H04S 2420/01; H04S 2420/07; G10K 11/16; G10K 11/178; G10K 11/17853; G10K 11/17854; G10L 21/02; G10L 21/0208; G10L 21/02087; H10L 2021/02161; G06F 3/165; H04B 3/23; H04B 3/32
USPC .......................................................... 381/71.1
See application file for complete search history.

(56) References Cited

U.S. PATENT DOCUMENTS

| | | | | |
|---|---|---|---|---|
| 8,045,840 | B2 * | 10/2011 | Murata | H04S 1/005<br>381/11 |
| 8,160,281 | B2 * | 4/2012 | Kim | H04R 3/02<br>381/310 |
| 9,277,343 | B1 * | 3/2016 | Alexandrov | H04S 1/002 |
| 2015/0264503 | A1 | 9/2015 | Hall et al. | |
| 2016/0212560 | A1 * | 7/2016 | Macours | H04R 5/04 |
| 2019/0373398 | A1 | 12/2019 | Breebart et al. | |
| 2020/0084560 | A1 | 3/2020 | Satonger et al. | |
| 2022/0014868 | A1 | 1/2022 | Binn et al. | |
| 2022/0141588 | A1 | 5/2022 | LiKamWa et al. | |

* cited by examiner

ACOUSTIC CROSSTALK CANCELLATION

FIELD OF THE INVENTION

The present disclosure relates to circuitry for acoustic crosstalk cancellation.

BACKGROUND

Stereo playback of audio signals typically involves delivering a left audio signal channel and a right audio signal channel to respective left and right speakers. However, stereo playback depends upon the left and right speakers being positioned sufficiently wide apart relative to the listener. In particular, there must be a relatively large difference between the angles of incidence of the respective acoustic signals from the left and right speakers in order for the listener's natural binaural stereo hearing to produce a stereo perception. This is because if playback occurs from two relatively closely spaced loudspeakers which present a relatively small difference in angle of incidence of the respective acoustic signals, then the acoustic signal from each respective speaker is also heard by the contralateral ear at a similar amplitude and with relatively little differential delay. This effect is known as acoustic crosstalk. The perceptual result of crosstalk is that perceived stereo cues of the played audio may be severely deteriorated, so that little or no stereo effect is perceived.

Acoustic crosstalk can be sufficiently avoided, and a stereo perception can be delivered to the listener(s), by placing the left and right speakers far apart relative to the listener(s), such as many meters apart at opposite sides of a room or theatre. However, this is not possible when using a physically compact audio playback device such as a smartphone or tablet computer, as the onboard speakers of such devices cannot be positioned far apart relative to the listener. In such devices the onboard speakers can be positioned no further apart than the furthest apart corners or sides of the respective device. Even if the device is brought inconveniently close to the listener in an attempt to increase the difference between the respective angles of incidence of the left and right acoustic signals to the listener's ears, this still fails to generate any significant stereo perception from the onboard speakers due to the small size of the compact device.

One way to achieve a suitable perceptible stereo playback when using compact playback devices is to use additional external speakers, such as headphone speakers or loudspeakers, driven from the playback device. However this introduces additional cost, size and weight of such external hardware and runs counter to the intended compact and lightweight mode of use of compact devices, while also reducing the achieved utility of the onboard speakers.

Attempts have been made to pre-process the left and right audio signal channels prior to playback in order to cancel acoustic crosstalk and provide the listener with a stereo perception when the speakers are relatively close together. However, these approaches have suffered from a number of problems including being highly sensitive to the position of the listener's head relative to the playback device, whereby even very slight head movements significantly diminish the perceived stereo effect and rapidly escalate spectral coloration producing unpleasant sound corruption, and also adding a substantial load on both transducers.

Additionally, existing acoustic crosstalk cancellation systems can lead to amplifier saturation and attendant distortion in the output acoustic signals. In general, such systems add a crosstalk cancellation signal to an input audio signal and output a combined audio and crosstalk cancellation signal to an amplifier of an output stage that drives a speaker. If the level of the combined audio and crosstalk cancellation signal is sufficiently high the amplifier may saturate, leading to distortion in the signal output by the amplifier and consequently to distortion in the acoustic signal output by the speaker.

Past attempts at acoustic crosstalk cancellation (XTC) have also suffered from a failure to optimise crosstalk cancellation evenly across the audio spectrum. It has been suggested to resolve this by frequency dependent regularisation involving hierarchical spectral division responsive to listening conditions, however this entails determining the frequency divisions and in turn complicates the crosstalk canceller design, which imports a significant processing burden and increased memory requirements, which is undesirable for typical compact playback devices. In particular the band branching method requires the input audio to be divided into numerous sub-bands, the widths of which are dependent on the playback geometry, sampling frequency etc. Then, each band is processed separately by a XTC design specifically for each band using a corresponding regularisation parameter. This is thus a complex XTC structure which undesirably increases processor and memory requirements of the crosstalk canceller.

SUMMARY

According to a first aspect, the invention provides circuitry for acoustic crosstalk cancellation between first and second acoustic signals, the circuitry comprising:

- crosstalk cancellation circuitry configured to:
  - receive a first audio signal and, based on the received first audio signal, generate a first crosstalk cancellation signal;
  - receive a second audio signal and, based on the received second audio signal, generate a second crosstalk cancellation signal;
  - combine the first crosstalk cancellation signal with a signal indicative of the second audio signal to generate a first crosstalk cancellation circuitry output signal; and
  - combine the second crosstalk cancellation signal with a signal indicative of the first audio signal to generate a second crosstalk cancellation circuitry output signal; and
- output stage circuitry configured to:
  - receive the first crosstalk cancellation circuitry output signal and, based on the received first crosstalk cancellation circuitry, generate a first drive signal for driving a first speaker to generate the first acoustic signal; and
  - receive the second crosstalk cancellation circuitry output signal and, based on the received second crosstalk cancellation circuitry, generate a second drive signal for driving a second speaker to generate the second acoustic signal,
  - wherein a parameter of the crosstalk cancellation circuitry is variable based on one or more of:
    - a position of a user of a host device incorporating the circuitry with respect to the host device;
    - a volume setting of the host device;
    - a level of the first and/or second crosstalk cancellation signal; and
    - an operational parameter of the output stage circuitry.

The circuitry may further comprise user position detection circuitry configured to detect the position of the user with respect to the host device.

The user position detection circuitry may be configured to detect a distance and/or an angle of the user with respect to the host device.

The user position detection circuitry may be configured to detect the distance and/or angle of the user with respect to the host device based on one or more of:

detected reflections of ultrasonic signals transmitted by a transducer of the host device; and images generated by a camera of the host device.

The crosstalk cancellation circuitry may comprise:

a first crosstalk cancellation filter for generating the first crosstalk cancellation signal; and a second crosstalk cancellation filter for generating the second crosstalk cancellation signal, wherein the user position detection circuitry is configured to output a coefficient control signal to the crosstalk cancellation circuitry to cause the crosstalk cancellation circuitry to adjust filter coefficients of the first and/or second crosstalk cancellation filters, based on the detected position of the user.

The crosstalk cancellation circuitry may be configured to select new filter coefficients for the first and/or second crosstalk cancellation filters from a memory based on the detected position of the user.

The crosstalk cancellation circuitry may be configured to calculate new filter coefficients for the first and/or second crosstalk cancellation filters based on the detected position of the user.

The circuitry may further comprise monitoring circuitry configured to monitor one or more operational parameters of the output stage circuitry.

The monitoring circuitry may be configured to output a level control signal to the crosstalk cancellation circuitry to adjust a level of the first and/or the second crosstalk cancellation signal if the monitoring circuitry detects, based on the one or more monitored operational parameters, that the output stage circuitry is at or is approaching a saturation state.

The monitoring circuitry may comprise circuitry for monitoring an output current and/or an output voltage associated with the output stage circuitry.

The monitoring circuitry may be configured to compare the monitored output current or output voltage to a predetermined current or voltage threshold to detect if the output stage circuitry is at or approaching a saturation state.

The monitoring circuitry may be configured to monitor the volume setting of the host device to output a level control signal to the crosstalk cancellation circuitry to adjust a level of the first and/or the second crosstalk cancellation signal if the volume setting meets or exceeds a predefined volume threshold.

The monitoring circuitry may be configured to monitor a level of the first and/or second crosstalk cancellation signal and to adjust the level of the first and/or second crosstalk cancellation signal if it is determined that the level of the first and/or second crosstalk cancellation signal could cause saturation of the output stage circuitry.

The circuitry may further comprise input filter circuitry configured to receive first and second input audio signals and to generate a first plurality of sub-band signals based on the first input audio signal and a second plurality of sub-band signals based on the second input audio signal.

The first audio signal received by the crosstalk cancellation circuitry may be based on a first sub-band signal of the first plurality of sub-band signals output by the input filter circuitry, and the second audio signal received by the crosstalk cancellation circuitry may be based on a first sub-band signal of the second plurality of sub-band signals output by the input filter circuitry.

The circuitry may further comprise equalisation circuitry configured to receive first and second input audio signals and to output first and second equalised audio signals to the crosstalk cancellation circuitry.

The equalisation circuitry may comprise:

a first set of biquadratic filters configured to receive the first input audio signal and to output the first equalised audio signal; and a second set of biquadratic filters configured to receive the second input audio signal and to output the second equalised audio signal.

According to a second aspect, the invention provides an integrated circuit comprising the circuitry of the first aspect.

According to a third aspect, the invention provides a host device comprising circuitry according to the first aspect.

The host device may comprise a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

According to a fourth aspect, the invention provides a crosstalk cancellation system for applying crosstalk cancellation to an audio signal, wherein a level of the crosstalk cancellation applied is variable based on one or more of:

a volume setting of the host device;

a level of a crosstalk cancellation signal to be applied to the audio signal; and an operational parameter of output stage circuitry for driving a transducer.

According to a fifth aspect, the invention provides a crosstalk cancellation system for applying crosstalk cancellation to an audio signal, wherein a parameter of the crosstalk cancellation applied is variable based on one or more of:

a position of a user of a host device incorporating the circuitry with respect to the host device;

a volume setting of the host device;

a level of a crosstalk cancellation signal to be applied to the audio signal; and an operational parameter of output stage circuitry for driving a transducer.

According to a sixth aspect, the invention provides circuitry for acoustic crosstalk cancellation between first and second acoustic signals, the circuitry comprising:

input filter circuitry configured to receive first and second audio input signals and to generate a first plurality of sub-band signals based on the first audio input signal and a second plurality of sub-band signals based on the second audio input signal; and crosstalk cancellation circuitry configured to:

generate a first crosstalk cancellation signal based on a first sub-band signal of the first plurality of sub-band signals;

generate a second crosstalk cancellation signal based on a first sub-band signal of the second plurality of sub-band signals;

combine the second crosstalk cancellation signal with a signal indicative of the first audio signal and a second sub-band signal of the first plurality of sub-band signals to generate a first crosstalk cancellation circuitry output signal; and combine the first crosstalk cancellation signal with a signal indicative of the second audio signal and a second sub-band signal of the second plurality of sub-band signals to generate a second crosstalk cancellation circuitry output signal.

According to a seventh aspect, the invention provides circuitry for acoustic crosstalk cancellation between first and second acoustic signals, the circuitry comprising:

crosstalk cancellation circuitry configured to:

receive a first audio signal and, based on the received first audio signal, generate a first crosstalk cancellation signal; and receive a second audio signal and, based on the received second audio signal, generate a second crosstalk cancellation signal; and position detection circuitry configured to detect the position of a user of a host device incorporating the circuitry with respect to the host device, wherein the position detection circuitry is configured to output a control signal to cause adjustment of an operational parameter of the crosstalk cancellation circuitry based on the detected position of the user.

According to an eighth aspect, the invention provides circuitry for acoustic crosstalk cancellation between first and second acoustic signals, the circuitry comprising:

crosstalk cancellation circuitry configured to:

receive a first audio signal and, based on the received first audio signal, generate a first crosstalk cancellation signal; and receive a second audio signal and, based on the received second audio signal, generate a second crosstalk cancellation signal; and output stage circuitry configured to:

receive the first crosstalk cancellation circuitry output signal and, based on the received first crosstalk cancellation circuitry, generate a first drive signal for driving a first speaker to generate the first acoustic signal; and receive the second crosstalk cancellation circuitry output signal and, based on the received second crosstalk cancellation circuitry, generate a second drive signal for driving a second speaker to generate the second acoustic signal, wherein the circuitry is configured to adjust a level of the first and/or the second crosstalk cancellation signal responsive to an indication of possible saturation of the output stage circuitry.

BRIEF DESCRIPTION OF THE DRAWINGS

Embodiments of the invention will now be described, strictly by way of example only, with reference to the accompanying drawings, of which.

DETAILED DESCRIPTION

Figure 1:
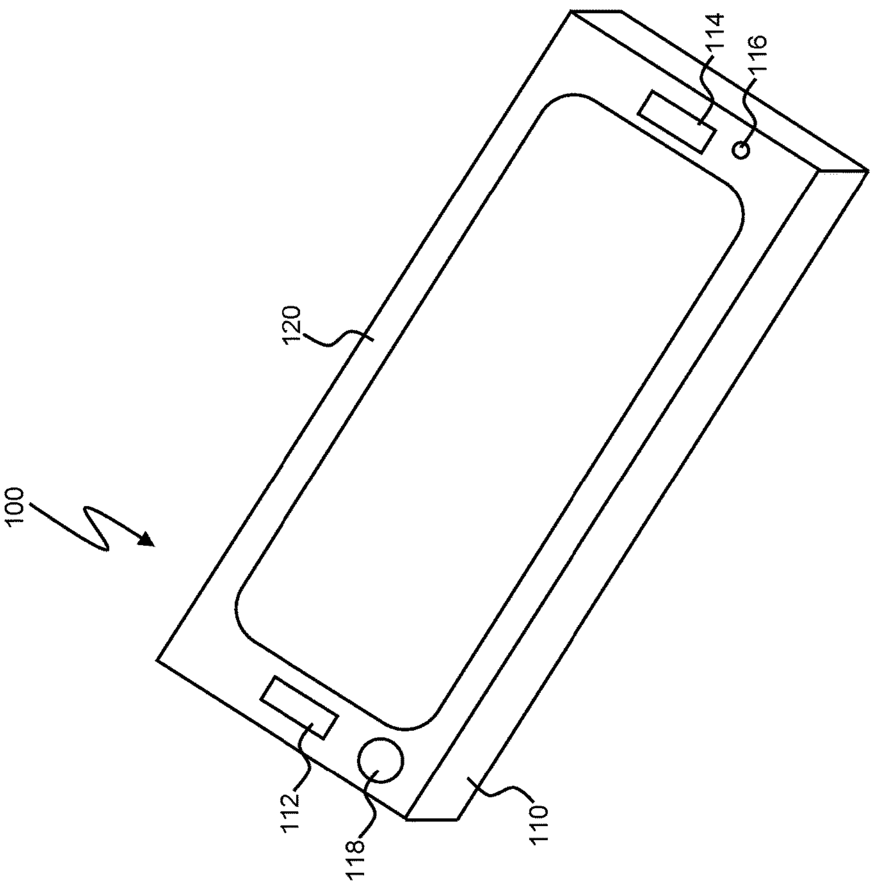
FIG. 1 is a schematic perspective view of a device having a pair of speakers.

Referring first to FIG. 1, a device such as a smartphone or tablet computer that is capable of audio playback is shown generally at 100.

The device, shown generally at 100, includes a housing 110 that includes first and second speaker ports 112, 114 which, in the illustrated example, are provided at opposite ends of a front face 120 of the device 100. As will be appreciated by those skilled in the art, in other examples the first and second speaker ports 112, 114 may be positioned differently, e.g., in opposite ends of the housing 110, or at opposite ends of a single side or end face of the housing 110.

The device 100 also includes a microphone 116, which in this example is positioned towards one end of the front face 120 of the device 100, adjacent the second speaker port 114. It will be appreciated that the device 100 may include one or more additional microphones 116, which may be positioned, for example, in the front face 120, in a side or end face of the housing 110, or in any other convenient location.

The device 100 may further include one or more cameras 118, positioned, for example, towards one end of the front face 120 of the device 100, and/or on a rear face of the device 100.

Figure 2:
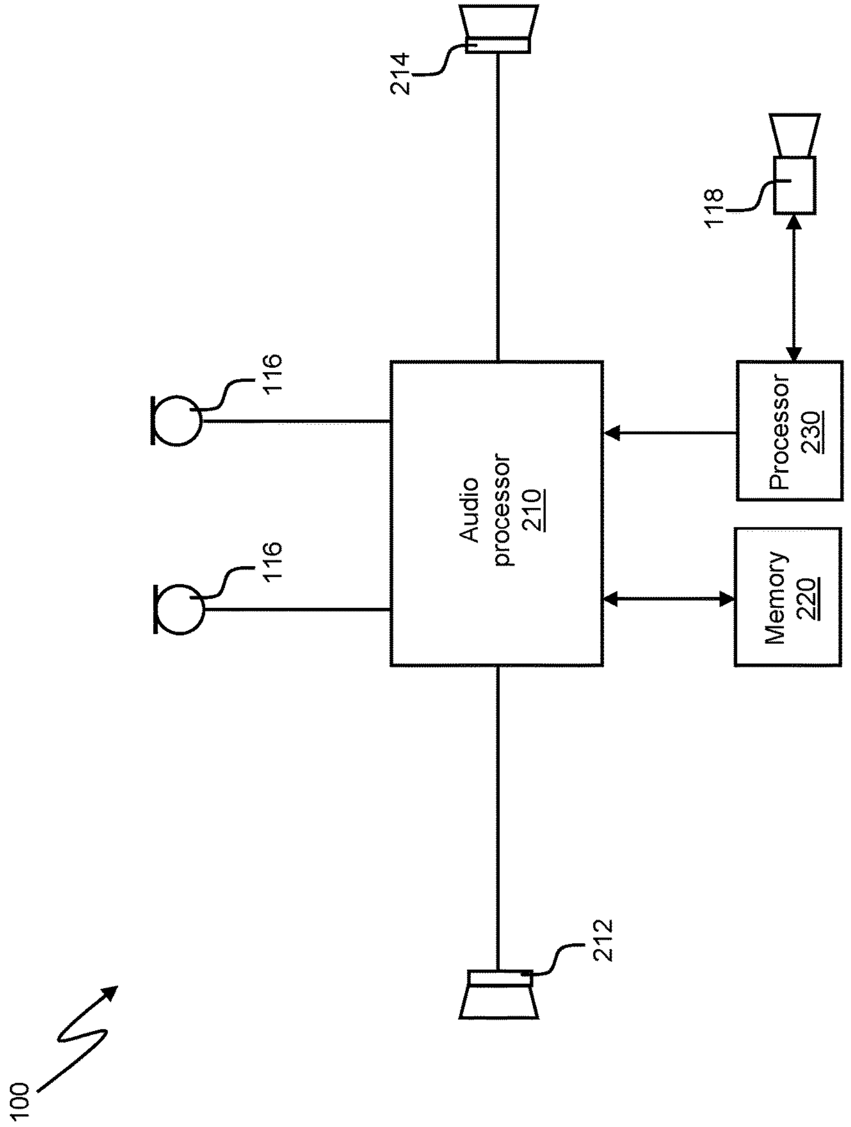
FIG. 2 is a schematic representation of an audio system of the device of FIG. 1.

FIG. 2 is a schematic representation of internal components of the device 100 of FIG. 1.

As shown in FIG. 2, the device 100 includes audio processor circuitry 210 for generating left and right audio output signals for driving speakers of the device 100. The audio processor circuitry 210 may be implemented as a single integrated circuit (IC) and may be configured to perform signal processing operations (e.g. filtering, crosstalk cancellation) on one or more received audio data streams to generate the left and right audio output signals.

The microphone(s) 116 are coupled to inputs of the audio processor circuitry 210.

The device 100 further includes left and right speakers 212, 214 which are coupled to the audio processor circuitry 210 to receive the respective left and right audio output signals from the audio processor circuitry 210. The left and right speakers 212, 214 are mounted in the left and right speaker ports 112, 114 of the device housing 110.

The device 100 further includes memory 220, coupled to the audio processor circuitry 210, for storing data used by the audio processor circuitry 210 to generate the left and right audio output signals, e.g., audio data, filter coefficients or other parameters used in the signal processing operations performed by the audio processor circuitry 210.

The device 100 further includes processing circuitry 230 coupled to the audio processor circuitry 210. The processing circuitry 230 may be, for example, an applications processor of the device 100.

As will be appreciated by those of ordinary skill in the art, a practical implementation of the device 100 will include additional components such as a battery, communications circuitry and the like, which are not relevant to the present disclosure and will not be described here for the sake of clarity and brevity.

Because of the small form factor of the device 100, the physical distance between the speaker ports 112, 114 (and thus between the left and right speakers 212, 214) is limited, and thus acoustic crosstalk can occur during playback of audio through the speakers 212, 214.

Figure 3:
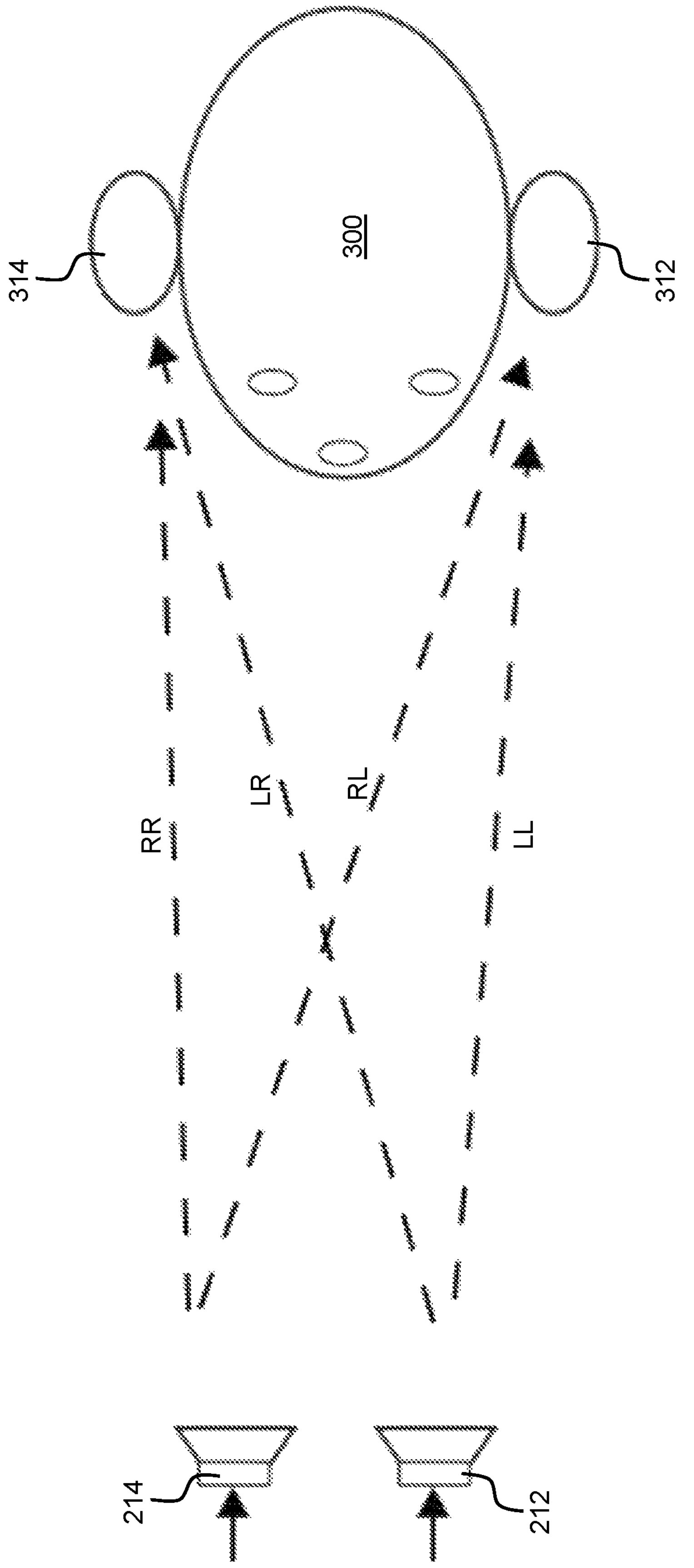
FIG. 3 is a graphical representation of acoustic crosstalk.

This is illustrated in FIG. 3, which shows that acoustic signals from each speaker 212, 214 are also received by the contralateral ear 314, 312 of a user 300 of the device. Thus, a first left acoustic signal component LL (denoting left speaker to left ear) output by the left speaker 212 travels along a first propagation path from the left speaker 212 to the user's left ear 312. A second left acoustic signal component LR (denoting left speaker to right ear) output by the left speaker 212 travels along a second propagation path from the left speaker 212 to the user's right ear 314. Similarly, a first right acoustic signal component RR (denoting right speaker to right ear) output by the right speaker 214 travels along a third propagation path from the right speaker to the user's right ear 314, and a second right acoustic signal component RL (denoting right speaker to left ear) output by the right speaker 214 travels along a fourth propagation path from the right speaker to the user's left ear 312.

As will be appreciated, the second left acoustic signal component LR and the second right acoustic signal component RL are acoustic crosstalk signals, and as explained above, this acoustic crosstalk can severely degrade the user's perception of stereo effects in the acoustic signals output by the speakers 212, 214.

Figure 4:
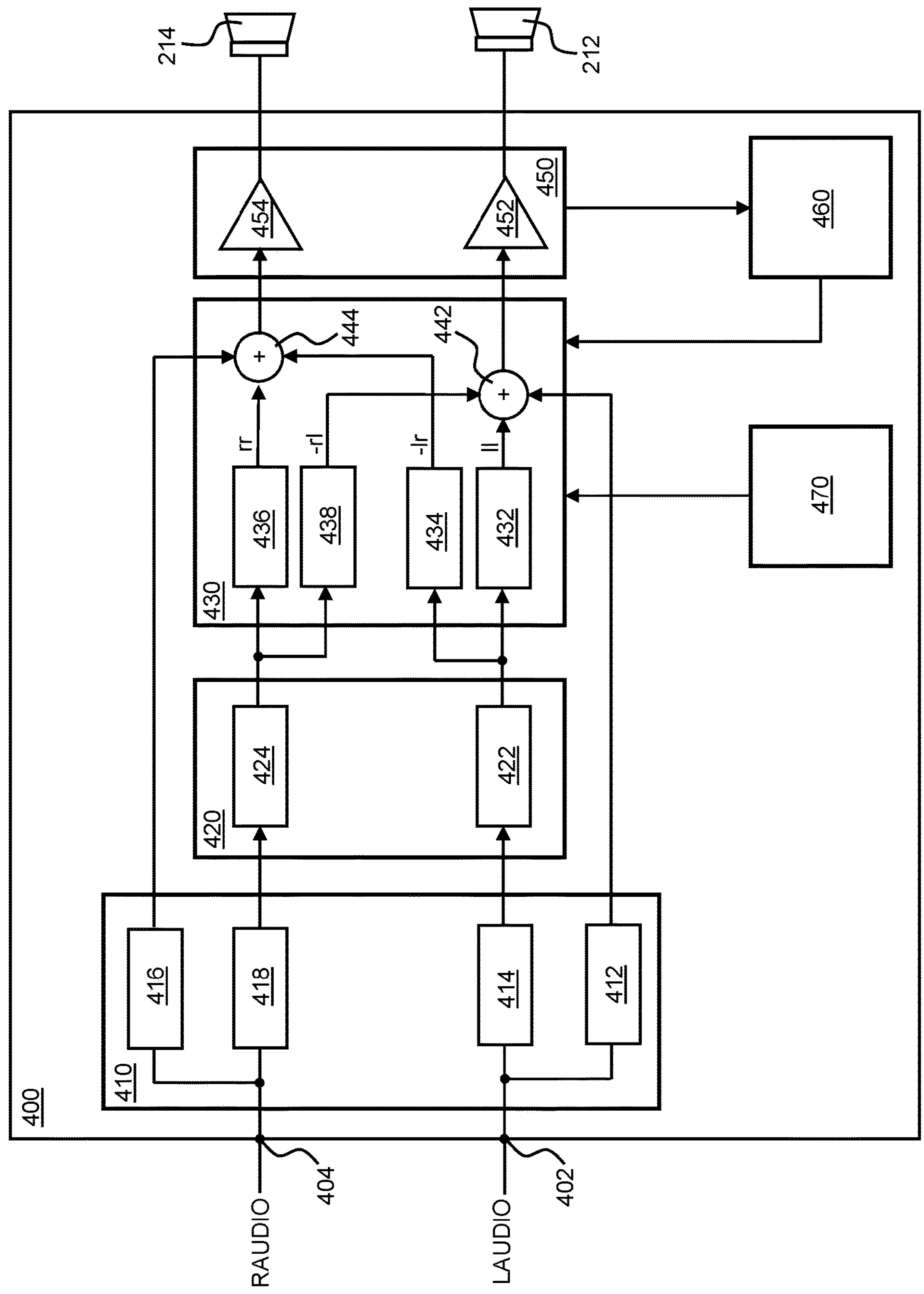
FIG. 4 is a schematic representation of a system for acoustic crosstalk cancellation according to the present disclosure.

FIG. 4 is a schematic representation of example circuitry for acoustic crosstalk cancellation according to the present disclosure. The circuitry may be implemented in, or form part of, the audio processor circuitry 210 of a device 100 such as a mobile telephone, smartphone, tablet computer or other small form factor device capable of audio playback.

The circuitry, shown generally at 400 in FIG. 4, includes input filter circuitry 410, equalisation circuitry 420, adaptive crosstalk cancellation circuitry 430, output stage circuitry 450, monitoring circuitry 460 and user position detection circuitry 470.

The circuitry 400 receives left and right audio signals LAUDIO, RAUDIO from a stereo audio source (not shown) at respective left and right audio input terminals 402, 404.

The input filter circuitry 410 is configured to divide the left and right input audio signals LAUDIO, RAUDIO into a plurality of sub-band signals. To this end, the input filter circuitry 410 includes a first plurality of filters which each receive the right input audio signal RAUDIO and a second plurality of filters which each receive the left input audio signal LAUDIO.

Thus, in the illustrated example the first plurality of filters comprises a first high-pass filter 412 and a first low-pass filter 414 which each receive the left input audio signal LAUDIO. The first high-pass filter 412 passes frequency components of the left input audio signal LAUDIO at frequencies above a threshold frequency to output a first high frequency sub-band signal, and the first low-pass filter 414 passes frequency components of the left input audio signal LAUDIO at frequencies below the threshold frequency to output a first low frequency sub-band signal.

Similarly, the second plurality of filters comprises a second high-pass filter 416 and a second low-pass filter, which each receive the right input audio signal RAUDIO. The second high-pass filter 416 passes frequency components of the right input audio signal RAUDIO at frequencies above the threshold frequency to output a second high frequency sub-band signal, and the second low-pass filter 418 passes frequency components of the right input audio signal RAUDIO at frequencies below the threshold frequency, to output a second low frequency sub-band signal.

In the illustrated example the first and second pluralities of filters each comprise two filters, but it will be appreciated by those of ordinary skill in the art that the input filter circuitry 410 could include any number of filters for dividing the input audio signals LAUDIO, RAUDIO into a plurality of sub-band signals with different frequency content.

The equalisation circuitry 420 is configured to process the sub-band signals output by the input filter circuitry 410 to maintain the spectral coloration of the input audio signals LAUDIO, RAUDIO. To this end the equalisation circuitry 420 includes first and second equalisation filters 422, 424 (or sets of equalisation filters, where a set of equalisation filters comprises one or more equalisation filters). The equalisation filters may be, for example, biquadratic filters.

The first equalisation filter 422 receives the first low frequency sub-band signal output by the first low-pass filter 414, and outputs a first equalised (or, more accurately, pre-equalised) signal to the adaptive crosstalk cancellation circuitry 430. Similarly, the second equalisation filter 424 receives the second low frequency sub-band signal output by the second low-pass filter 418, and outputs a second equalised (or, more accurately, pre-equalised) signal to the adaptive crosstalk cancellation circuitry 430.

The adaptive crosstalk cancellation circuitry 430 is configured to receive the first and second equalised signals output by the equalisation circuitry 420, and to output first and second crosstalk canceller output signals that compensate, at least partially, for the acoustic crosstalk between the acoustic signals output by the left and right speakers 212, 214 of the device 100 and the user's opposite ears 314, 312, such that the acoustic crosstalk signals that arrive at the user's ears from the opposite speaker (i.e. the acoustic crosstalk signal RL that travels along the propagation path from the right speaker 214 to the user's left ear 312 and the acoustic crosstalk signal LR that travels along the propagation path from the left speaker 212 to the user's right ear 314) are at least partially cancelled or attenuated.

The adaptive crosstalk cancellation circuitry 430 thus includes a first audio output signal filter 432 and a first crosstalk cancellation filter 434, which each receive the equalised signal output by the first equalisation filter 422. The adaptive crosstalk cancellation circuitry 430 further includes a second audio output signal filter 436 and a second crosstalk cancellation filter 438, which each receive the equalised signal output by the second equalisation filter 424.

The first audio output signal filter 432 is configured to generate, based on the received equalised signal, an audio signal ll representative of the acoustic signal component LL, and this audio signal ll is output by the first audio output signal filter 432 to a first input of a first summing node 442 of the adaptive crosstalk cancellation circuitry 430.

The first crosstalk cancellation filter 434 is configured to generate, based on the received equalised signal, a first crosstalk cancellation signal −lr, which is an audio signal representative of the inverse of the acoustic signal component LR, and this audio signal −lr is output by the first crosstalk cancellation filter 434 to a first input of a second summing node 444 of the adaptive crosstalk cancellation circuitry 430.

The second audio output signal filter 436 is configured to generate, based on the received equalised signal, an audio signal rr representative of the acoustic signal component RR, and this audio signal rr is output by the second audio output signal filter 436 to a second input of the second summing node 444.

The second crosstalk cancellation filter 438 is configured to generate, based on the received equalised signal, a second crosstalk cancellation signal −rl, which is an audio signal representative of the inverse of the acoustic signal component RL, and this audio signal −rl is output by the second crosstalk cancellation filter 438 to a second input of the first summing node 442.

The first summing node 442 also receives the first high frequency sub-band signal output by the first high-pass filter 412 of the input filter circuitry 410, and the second summing node 444 also receives the second high frequency sub-band signal output by the second high-pass filter 416 of the input filter circuitry 410.

Thus, the first summing node 442 is configured to output a signal including the first high frequency sub-band signal and components ll and −rl, while the second summing node 444 is configured to output a signal including the second high frequency sub-band signal and components rr and −lr.

It will be noted that the first and second high frequency sub-band signals output, respectively, by the first and second high-pass filters 412, 416 of the input filter circuitry 410 are not processed by the equalisation circuitry 420 or by the adaptive crosstalk cancellation circuitry 430, but are instead added to the outputs of the filters of the adaptive crosstalk cancellation circuitry 430. By applying crosstalk cancellation processing only to the low frequency sub-bands of the input audio signals in this manner it may be possible to reduce or avoid audio coloration that may otherwise be introduced into the acoustic output signals as a result of applying crosstalk cancellation processing to the full-band input audio signals, as the higher frequency sub-bands of the input audio signals that may give rise to such audio coloration are not processed by the adaptive crosstalk cancellation circuitry 430.

In alternative examples of the circuitry 400, the input filter circuitry 410 may be omitted, in which case the equalisation circuitry 420 receives and processes the left and right input audio signals LAUDIO, RAUDIO rather than any sub-band signals, and no separate high frequency sub-band signals are received by the first or second summing nodes 442, 444.

The output stage circuitry 450 comprises first amplifier circuitry 452 and second amplifier circuitry 454. The first amplifier circuitry 452 is configured to receive the signal output by the first summing node 442 and, based on this received signal, generate and output a drive signal for driving a first speaker (e.g., a left speaker 212) of a host device incorporating the circuitry 400. Similarly, the second amplifier circuitry 454 is configured to receive the signal output by the second summing node 444 and, based on this received signal, generate and output a drive signal for driving a second speaker (e.g., a right speaker 214) of the host device.

The monitoring circuitry 460 is configured to monitor one or more operational parameters such as an output signal level of the output stage circuitry 450, to detect if one or both of the first and second amplifier circuitry 452, 454 is at or approaching a saturation state.

If the monitoring circuitry 460 detects (based on the monitored operational parameter(s)) that one or both of the first and second amplifier circuitry 452, 454 is at or approaching a saturation state, it may output a level control signal to the adaptive crosstalk cancellation circuitry 430, to cause the adaptive crosstalk cancellation circuitry 430 to adjust a level of one or both of the crosstalk cancellation signals −lr, −rl, to reduce the signal level of the signal(s) received at the input of the first and/or second amplifier circuitry 452, 454 to a level at which saturation of the amplifier circuitry 452, 454 can be avoided.

In some examples, the monitoring circuitry 460 may include circuitry for monitoring an output voltage and/or an output current of the first and/or second amplifier circuitry 452, 454 and comparing the output voltage and/or current to one or more predefined voltage and/or current thresholds to detect whether the first and/or second amplifier circuitry 452, 454 is at or approaching a saturation state.

Thus, if the monitored output voltage and/or current of one or both of the first and second amplifier circuitry 452, 454 meets or exceeds a predefined threshold, the monitoring circuitry 460 may output the level control signal to the adaptive crosstalk cancellation circuitry 430 to cause the adaptive crosstalk cancellation circuitry 430 to adjust the signal level of the crosstalk cancellation signal(s) −lr, −rl as described above.

Additionally or alternatively, the monitoring circuitry 460 may be configured to monitor a volume setting of the host device and to output a level control signal to the adaptive crosstalk cancellation circuitry 430 to cause the adaptive crosstalk cancellation circuitry 430 to adjust the signal level of the crosstalk cancellation signal(s) −lr, −rl as described above if the volume setting meets or exceeds a predefined volume threshold.

For example, the monitoring circuitry 460 may be configured to monitor a volume control signal output by the processing circuitry 230 to determine the volume setting of the device, and based on this volume control signal determine whether an adjustment to the level of the crosstalk cancellation signals −lr, −ll is required to avoid saturation of the amplifier circuitry 452, 454.

In some examples the monitoring circuitry 460 may monitor a level of the crosstalk cancellation signals −lr, −ll in addition to monitoring the volume setting of the device, to determine whether the level of the signals received at the first and second amplifier circuitry 452, 454 could cause saturation of the first and/or second amplifier circuitry 452, 454. If so, the monitoring circuitry 460 may output the level control signal to the adaptive crosstalk cancellation circuitry 430 to cause the adaptive crosstalk cancellation circuitry 430 to adjust the signal level of the crosstalk cancellation signal(s) −lr, −rl as described above.

By adjusting the level of the crosstalk cancellation signals −lr, −ll based on one or more operational parameters of the output stage circuitry 450, and/or based on a volume setting of the host device, and/or based on the level of one or both of the crosstalk cancellation signals −lr, −rl in this way, saturation of the amplifier circuitry 452, 454 and the attendant distortion in the acoustic signals output by the speakers 212, 214 can be avoided.

The user position detection circuitry 470 is configured to detect a position, e.g. a distance and/or an angle, of a user with respect to the speakers 212, 214 or some other reference point of the host device, and to output a coefficient control signal to the adaptive crosstalk cancellation circuitry 430 to cause the adaptive crosstalk cancellation circuitry 430 to dynamically adjust filter coefficients of the first and/or second crosstalk cancellation filters 434, 438 based on the detected position of the user.

In some examples a plurality of sets of filter coefficients for the second and fourth crosstalk cancellation filters are stored in a memory (e.g. memory 220). In response to the coefficient control signal, the adaptive crosstalk cancellation circuitry 430 may retrieve from the memory a set of filter coefficients suitable for the detected distance and/or angle of the user with respect to the host device, and apply the retrieved set of coefficients to the first and/or second crosstalk cancellation filters 434, 438.

The plurality of sets of filter coefficients may be stored in a lookup table in the memory, indexed by distance and/or by angle. The coefficient control signal output by the user position detection circuitry 470 may be representative of the detected distance and/or the detected angle, and the adaptive crosstalk cancellation circuitry 430 may select a new set of filter coefficients from the lookup table based on the detected distance and/or the detected angle, as represented by the coefficient control signal.

Alternatively, the adaptive crosstalk cancellation circuitry 430 may be configured to calculate new filter coefficients for the first and/or second crosstalk cancellation filters 434, 438 on the fly based on the coefficient control signal, and to apply the determined filter coefficients to the first and/or second crosstalk cancellation filters 434, 438.

By dynamically adjusting the filter coefficients of the first and/or second crosstalk cancellation filters 434, 438 based on the detected distance and/or angle of the user with respect to the host device, the crosstalk cancellation signals −rl, −lr output by the crosstalk cancellation filters 434, 438 can be tuned to optimise (or at least improve) the crosstalk cancellation effect for a wide range of user positions relative to the host device, thereby increasing the size of the "sweet spot" within which stereo effects in the acoustic signals output by the speakers are perceptible to a user of a host device incorporating the circuitry 400. In other words, the dynamic adjustment of the filter coefficients allows the user to perceive the stereo effects in the acoustic signals output by the speakers 212, 214 at a greater range of relative distances and/or angles of the user with respect to the host device than in existing crosstalk cancellation systems.

The user position detection circuitry 470 may be configured to detect the position (distance and/or angle) of the user with respect to the host device in a number of different ways. For example, the user position detection circuitry 470 may detect the position of the user by processing reflections, detected by the microphone(s) 116, of ultrasonic signals transmitted by one or both of the speakers 212, 214. Additionally or alternatively, the user position detection circuitry 470 may detect the position of the user based on images generated by the camera 118 and processed by the processing circuitry 230. Those of ordinary skill in the art will be aware of other methods for detecting the position of a user relative to the host device which could be employed by the user position detection circuitry 470.

The circuitry described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code (or the resulting configuration data) may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. Circuitry for acoustic crosstalk cancellation between first and second acoustic signals, the circuitry comprising:
- crosstalk cancellation circuitry configured to:
  - receive a first audio signal and, based on the received first audio signal, generate a first crosstalk cancellation signal;
  - receive a second audio signal and, based on the received second audio signal, generate a second crosstalk cancellation signal;
  - combine the first crosstalk cancellation signal with a signal indicative of the second audio signal to generate a first crosstalk cancellation circuitry output signal; and
  - combine the second crosstalk cancellation signal with a signal indicative of the first audio signal to generate a second crosstalk cancellation circuitry output signal; and
- output stage circuitry configured to:
  - receive the first crosstalk cancellation circuitry output signal and, based on the received first crosstalk cancellation circuitry output signal, generate a first drive signal for driving a first speaker to generate the first acoustic signal; and
  - receive the second crosstalk cancellation circuitry output signal and, based on the received second crosstalk cancellation circuitry output signal, generate a second drive signal for driving a second speaker to generate the second acoustic signal,
  - wherein a parameter of the crosstalk cancellation circuitry is variable based on a volume control signal output by processing circuitry of a host device incorporating the circuitry, wherein the volume control signal is indicative of a volume setting of the host device.

2. Circuitry according to claim 1, further comprising user position detection circuitry configured to detect the position of the user with respect to the host device.

3. Circuitry according to claim 2, wherein the user position detection circuitry is configured to detect a distance and/or an angle of the user with respect to the host device.

4. Circuitry according to claim 3, wherein the user position detection circuitry is configured to detect the distance and/or angle of the user with respect to the host device based on one or more of:
- detected reflections of ultrasonic signals transmitted by a transducer of the host device; and
- images generated by a camera of the host device.

5. Circuitry according to claim 2, wherein the crosstalk cancellation circuitry comprises:
- a first crosstalk cancellation filter for generating the first crosstalk cancellation signal; and
- a second crosstalk cancellation filter for generating the second crosstalk cancellation signal,
- wherein the user position detection circuitry is configured to output a coefficient control signal to the crosstalk cancellation circuitry to cause the crosstalk cancellation circuitry to adjust filter coefficients of the first and/or second crosstalk cancellation filters, based on the detected position of the user.

6. Circuitry according to claim 5, wherein the crosstalk cancellation circuitry is configured to select new filter coefficients for the first and/or second crosstalk cancellation filters from a memory based on the detected position of the user.

7. Circuitry according to claim 5, wherein the crosstalk cancellation circuitry is configured to calculate new filter coefficients for the first and/or second crosstalk cancellation filters based on the detected position of the user.

8. Circuitry according to claim 1, wherein the circuitry further comprises monitoring circuitry configured to monitor one or more operational parameters of the output stage circuitry.

9. Circuitry according to claim 8, wherein the monitoring circuitry is configured to output a level control signal to the crosstalk cancellation circuitry to adjust a level of the first and/or the second crosstalk cancellation signal if the monitoring circuitry detects, based on the one or more monitored operational parameters, that the output stage circuitry is at or is approaching a saturation state.

10. Circuitry according to claim 8, wherein the monitoring circuitry comprises circuitry for monitoring an output current and/or an output voltage associated with the output stage circuitry.

11. Circuitry according to claim 10, wherein the monitoring circuitry is configured to compare the monitored output current or output voltage to a predetermined current or voltage threshold to detect if the output stage circuitry is at or approaching a saturation state.

12. Circuitry according to claim 11, wherein the monitoring circuitry is configured to monitor the volume setting of the host device to output a level control signal to the crosstalk cancellation circuitry to adjust a level of the first and/or the second crosstalk cancellation signal if the volume setting meets or exceeds a predefined volume threshold.

13. Circuitry according to claim 12, wherein the monitoring circuitry is configured to monitor a level of the first and/or second crosstalk cancellation signal and to adjust the level of the first and/or second crosstalk cancellation signal if it is determined that the level of the first and/or second crosstalk cancellation signal could cause saturation of the output stage circuitry.

14. Circuitry according to claim 1, further comprising input filter circuitry configured to receive first and second input audio signals and to generate a first plurality of sub-band signals based on the first input audio signal and a second plurality of sub-band signals based on the second input audio signal, wherein the first audio signal received by the crosstalk cancellation circuitry is based on a first sub-band signal of the first plurality of sub-band signals output by the input filter circuitry, and wherein the second audio signal received by the crosstalk cancellation circuitry is based on a first sub-band signal of the second plurality of sub-band signals output by the input filter circuitry.

15. Circuitry according to claim 14, wherein the circuitry further comprises equalisation circuitry configured to receive the first and second sub-band signals output by the input filter circuitry and to output first and second equalised audio signals to the crosstalk cancellation circuitry.

16. Circuitry according to claim 15, wherein the equalisation circuitry comprises:
- a first set of biquadratic filters configured to receive the first input audio signal and to output the first equalised audio signal; and a second set of biquadratic filters configured to receive the second input audio signal and to output the second equalised audio signal.

17. An integrated circuit comprising the circuitry of claim 1.

18. A host device comprising circuitry according to claim 1.

19. A host device according to claim 18, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

20. Circuitry for acoustic crosstalk cancellation between first and second acoustic signals, the circuitry comprising:

crosstalk cancellation circuitry configured to:

receive a first audio signal and, based on the received first audio signal, generate a first crosstalk cancellation signal; and receive a second audio signal and, based on the received second audio signal, generate a second crosstalk cancellation signal; and output stage circuitry configured to:

receive the first crosstalk cancellation circuitry output signal and, based on the received first crosstalk cancellation circuitry, generate a first drive signal for driving a first speaker to generate the first acoustic signal; and receive the second crosstalk cancellation circuitry output signal and, based on the received second crosstalk cancellation circuitry, generate a second drive signal for driving a second speaker to generate the second acoustic signal, wherein the circuitry is configured to adjust a level of the first and/or the second crosstalk cancellation signal responsive to an indication of possible saturation of the output stage circuitry;

wherein the circuitry further comprises monitoring circuitry configured to monitor an output voltage and/or an output current associated with the output stage circuitry, and wherein the monitoring circuitry is configured to compare the monitored output current or output voltage to a predetermined current or voltage threshold to detect if the output stage circuitry is at or approaching a saturation state.

* * * * *